United States Patent Office 3,328,647
Patented June 27, 1967

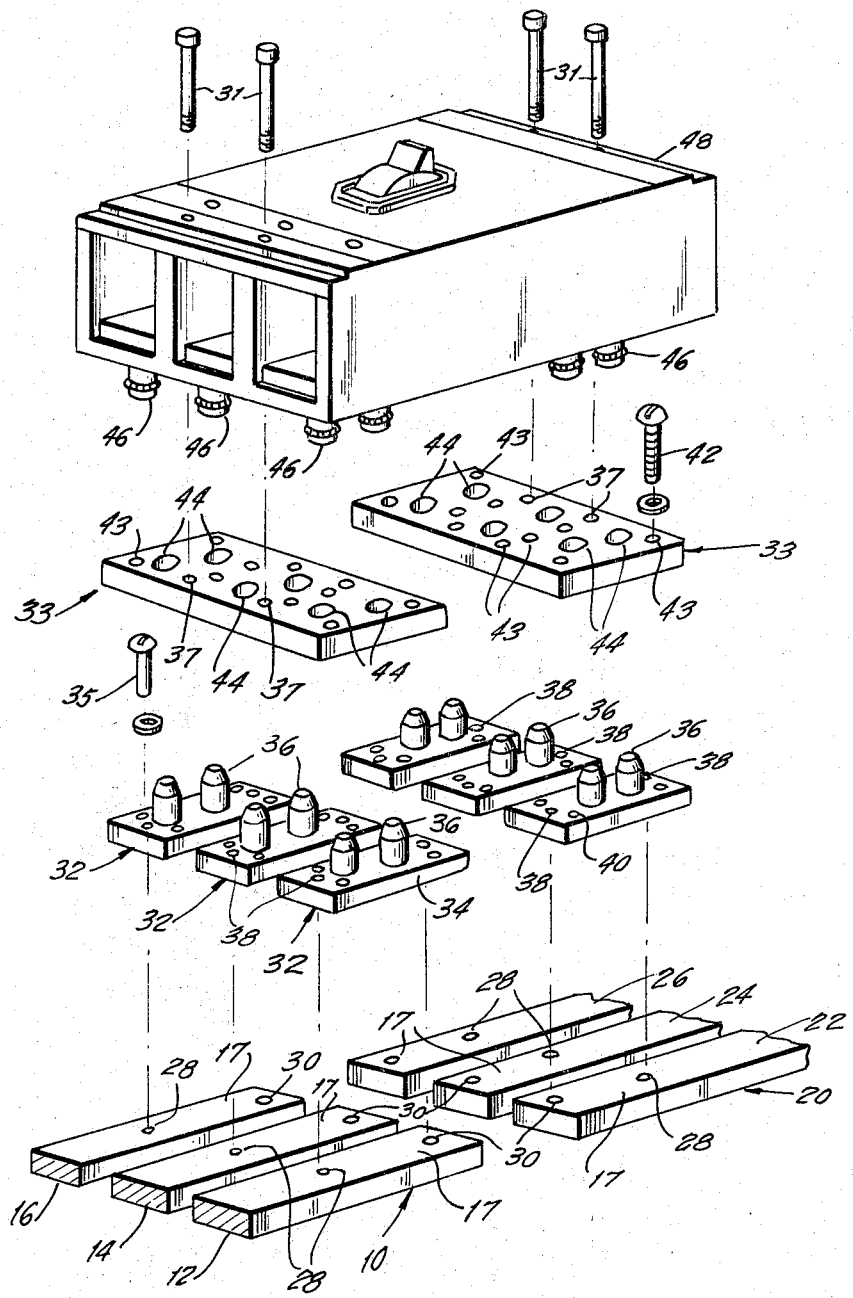

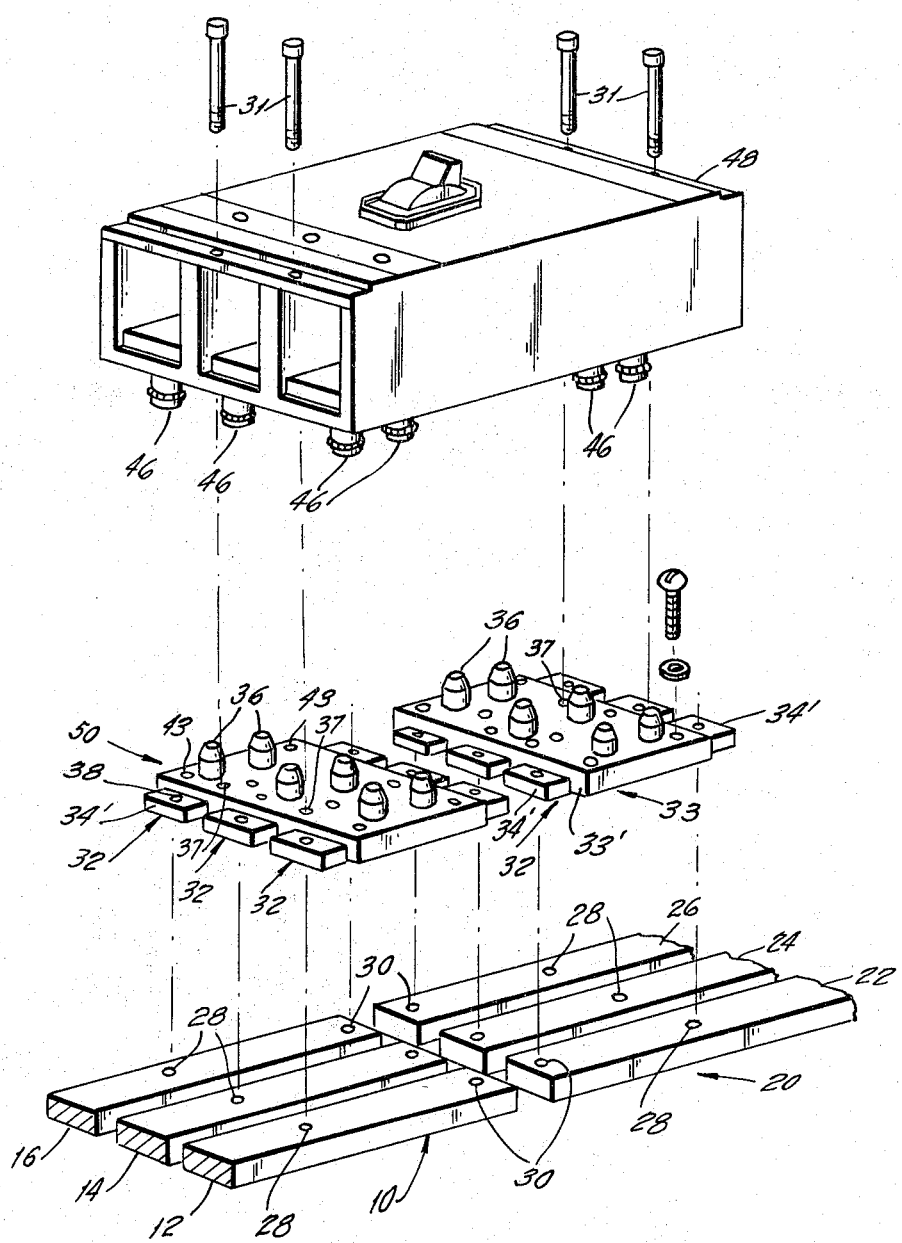

3,328,647
MOUNTING ASSEMBLY INCLUDING FRONT
CONNECTED SEPARABLE CONNECTORS
Carl E. Gryctko, Haddon Heights, N.J., assignor to I-T-E
Circuit Breaker Company, Philadelphia, Pa., a corporation of Pennsylvania
Filed Mar. 16, 1966, Ser. No. 534,753
9 Claims. (Cl. 317—119)

This invention relates to a mounting assembly for electrically and mechanically connecting a circuit breaker to its cooperating bus bars, and more particularly relates to such a mounting assembly wherein the individual conductive members which connect the circuit breaker to the bus bars are mounted to the bus bars on their front surfaces thereof.

In the utilization of nearly all bus bar systems, the bus bars thereof are first mounted on a suitable support. In the prior art, a mounting block is then provided having individual conductors to be secured to the individual bus bars. These conductors pass through and forward of an opening in the bus bar for ultimate connection to a circuit breaker, and are tightly mounted to the bus bar from the rear thereof. Should it be required to remove the mounting block or individual conductor thereof, it is necessary to obtain access to the rear of the bus bar system. However, oftentimes, it happens that the rear of the bus bar system is not conveniently accessible.

In contrast thereto the instant invention provides a mounting assembly wherein the individual conductive members to which the circuit breaker will be ultimately connected are mounted to their individual bus bars on the front surfaces thereof. A transversely extending insulative member, having openings for forwardly extending conductive portions of the front mounted conductive members, is then placed across the bus bar assembly and may also be secured to the front of the bus bars. The insulative members serves to rigidly support and align the bus bar assembly while at the same time serving as the mounting upon which the circuit breakers will eventually rest.

Should it be desired to remove the insulative member and/or any one of the individual conductive members, the entire removal or replacement thereof may be accomplished from the front side of the bus bar assembly, thereby completely eliminating the necessity of ever reaching the back side thereof.

As an alternative embodiment of the instant invention, the individual conductive members are integrally contained within the transversely extending insulative mounting block, with end portions of the conductive members extending out of side surfaces of the insulative mounting block whereby the entire assembly, comprising insulative block and substantially encased individual conductive members, may be mounted to the bus bars. In the alternative embodiment as in the embodiment discussed above, the forwardly extending conductive portions of the conductive members extend transversely with respect to the front surface of bus bars through suitable apertures provided in the top surface of the insulative member so that the terminals of the circuit breaker may be easily secured thereto.

By providing that the conductive members be secured to the front surface of the bus bar, a considerable saving in depth is achieved when compared to the prior art mounting assemblies wherein the mounting block and conductive members were mounted on the rear surface of the bus bar.

Accordingly, it is an object of the instant invention to provide a mounting assembly in which the individual conductive members thereof are mounted to the front surface of a bus bar.

It is another object of the instant invention to provide a mounting assembly for securing components such as circuit breakers to bus bar assemblies, which mounting assembly achieves a considerable savings in depth when compared to the equivalent mounting assemblies of prior art.

It is another object of the instant invention to provide a mounting assembly wherein the individual conductive members thereof are secured to the front surface of their respective bus bars, and wherein such individual conductive members are substantially encased within an insulating block which extends transversely with respect to the longitudinal axis of the bus bars on which the resulting assembly is secured.

Other objects and a fuller understanding of the instant invention may be had by referring to the following description and drawings, in which:

FIGURE 1 is an exploded perspective view of one embodiment of the instant invention; and FIGURE 2 is an exploded perspective view of an alternative embodiment of the instant invention.

Referring to FIGURE 1, there is shown a first bus bar assembly 10 upon which the load or line side of a circuit breaker 48 is to be electrically and mechanically secured. Assembly 10 includes first, second and third bus bars 12, 14 and 16, respectively. Although three bus bars have been shown and a three-phase system will be referred to throughout the remainder of the specification, it is to be understood that the instant invention is applicable to bus bar systems comprising any number of bus bars. A second bus bar assembly 20 comprising bus bars 22, 24, and 26 is provided in axial alignment with bus bar assembly 10 with the individual bus bars 12, 22, 14, 24 and 16, 26, being in substantial axial alignment. Assembly 20 is ultimately connected to the opposite side of breaker 48. Although not shown, bus bar assemblies 10 and 20 are suitably mounted upon a suitable support frame.

Each of the bus bars 12, 14, 16, 22, 24 and 26 is provided with a pair of spaced apart openings 28, 30, preferably tapped, to permit the securement of conductive members 32 to the front surfaces 17 of the respective bus bars by fastening means such as screws 35.

The conductive members 32 comprise essentially rectangular planar surfaces 34 with a stud-like portion 36 extending transversely with respect to the planar surface 34 and the bus bar surfaces 17 on which the conductive member 32 will eventually be secured. The planar surface 34 includes a pair of openings 38 therethrough which are aligned with the spaced openings 28, 30 of the respective bus bars to facilitate the securement of conductive member 32 by screws 35. Conductive members 32 include other apertures 40 through which fastening means such as the screw 42 of FIGURE 1 may pass in securing insulative member 33 to the conductive members 32.

Insulative members 33 comprise generally rectangular elements of suitable insulating material and are adapted to be securely mounted transversely with respect to the longitudinal axis of the bus bar assemblies 10 and 20. To this end insulative members 33 include openings such as 43 through which the fastening means 42 may pass to secure insulative members 33 to conductive members 32. Insulative members 33 may also be directly secured to buses 12, 14, 16 or 22, 24, 26, respectively, of bus bar assemblies 10 and 20 by providing additional aligned tapped apertures in the surfaces 17 thereof. Insulative members 33 are further provided with larger openings 44 through which the stud-like forwardly extending portions 36 of the conductive members 32 may pass into eventual engagement with the tulip-like terminals 46 provided on the circuit breaker 48 which is to be electrically connected to the bus bar assemblies 10 and 20. It is to be appreciated that the insulative members 33 provide a triple function in that, (1) they position and align the bus bars 12, 14, 16 or 22, 24, 26, with respect to one another, viz. through the conductive members 32, (2) they provide insulation between the circuit breaker 48 and the conductive members 32, and (3) they provide suitable support upon which the circuit breaker 48 may rest.

It will be further appreciated that during assembly of the mounting described above, the conductive members 32 may be first secured to their respective bus bars and then the insulative members secured to the conductive members (and bus bars if desired), or alternatively, the insulative members 33 may be secured to the conductive members 32, and the entire unit then assembled on the bus bars 12, 14, 16 or 22, 24, 26.

Finally, the circuit breaker 48 may be simply and easily positioned so that the terminals 46 thereof engage the stud-like forward portions 36 of the conductive members 32. Securement of circuit breaker 48 is achieved by fastening means such as screws 31 passing through apertures in the circuit breaker ind into screw-threaded engagement with apertures 37 of insulative members 33. It will be apparent that in accordance with the instant invention, partial or total dismantling of the mounting assembly described may be completed from the front surface of the bus bars thus completely eliminating the necessity of ever reaching the back side thereof.

Referring to FIGURE 2, wherein like numbers have been used to identify like parts, there is shown an alternative embodiment of the instant invention. In this embodiment the conductive members 32 are substantially encased by the insulative members 33 with end portions 34' of conductive members 32 extending outside surfaces 33' of insulative members 33 for securement to the respective bus bars. Similarly, the forward extending stud-like portions 36 of conductive members 32 extend out the top surface of insulative members 33 for connection to the circuit breaker 48.

In assembling the embodiment of FIGURE 2, the integral assemblies 50 are secured to the bus bars 12, 14, 16 and 22, 24, 26 by means of fastening means such as screws 35 (FIGURE 1) which will pass through openings 38 of conductive members 32 into the spaced apart tapped apertures 28, 30 provided on the bus bars. Finally, by means of screws 31 the circuit breaker 48 may be secured in place with its terminals 46 engaging the forward extending portions 36 of the conductive members 32.

It will be appreciated that the unitary assembly 50 which characterizes the embodiment of FIGURE 2 will materially simplify connection of circuit breakers to their associated bus bar assemblies and consequently will permit relatively unskilled, field-located, personnel to make the required connections in relatively short periods of time. It will be further appreciated that the entire connection and assembly described with respect to FIGURE 2 takes place from the front surface of the respective bus bars and thus eliminates the prior art disadvantages discussed above.

Although there has been described a preferred embodiment of this novel invention, many variations and modifications will now be apparent to those skilled in the art. Therefore, this invention is to be limited, not by the specific disclosure herein, but only by the appending claims.

What is claimed is:
1. A mounting assembly comprising:
 a first bus bar having a front and rear surface;
 a first conductive member secured to said bus bar on its front surface thereof, said conductive member having a longitudinally extending surface and an extending conductive portion extending transversely away from said longitudinally extending surface and the front surface of said bus bar; and
 a first insulative member secured to said conductive member and supported on said longitudinally extending surface, said insulative member having an aperture through which said extending conductive portion passes.

2. The mounting assembly of claim 1, wherein said first bus bar has a pair of spaced apart openings provided on its front surface, and said longitudinally extending surface of said first conductive member has openings therethrough which are aligned with said spaced apart openings to facilitate securement of said first conductive member to the front surface of said first bus bar.

3. The mounting assembly of claim 2, wherein said spaced apart openings are tapped to permit the entry of screw threaded fastening means therein.

4. The mounting assembly of claim 1, and further including:
 a second bus bar extending in longitudinal alignment with said first bus bar along a portion of its length, said second bus bar having a front and rear surface;
 a second conductive member secured to said second bus bar on its front surface thereof, said second conductive member having a longitudinally extending surface and an extending conductive portion extending transversely away from said longitudinally extending surface and the front surface of said second bus bar; and
 a second insulative member secured to said second conductive member and supported on its longitudinally extending surface, said second insulative member having an aperture through which said extending conductive portion of said second conductive member passes;
 said extending conductive portions of said first and second conductive members being spaced from one another by a predetermined distance to facilitate the attachment thereto of terminals of a circuit component which is mounted on said insulative members.

5. The mounting assembly of claim 4 and further including:
 a third bus bar extending substantially parallel to said first bus bar for a portion of its length, said third bus bar having a front and rear surface;
 a fourth bus bar extending in longitudinal alignment with said third bus bar along a portion of its length, said fourth bus bar having a front and rear surface;
 a third and fourth conductive member secured to said third and fourth bus bars, respectively, on their respective front surfaces thereof, said third and fourth conductive members having respective longitudinally extending surfaces and an extending conductive portion extending transversely away from the respective longitudinally extending surface and front surfaces of said third and fourth bus bars;
 said first and second insulative members being additionally secured to said third and fourth conductive members and supported on their respective longitudinally extending surface, respectively, each of said first and second insulative members having a second aperture through which the extending conductive portions of said third and fourth conductive members pass;
 said extending conductive portions of said third and fourth conductive members being spaced from one another by a predetermined distance to facilitate the attachment thereto of terminals of a circuit component which is mounted on said first and second insulative members.

6. The mounting assembly of claim 1, wherein said first conductive member and said first insulative member is a unitary assembly, said first conductive member being substantially encased by said first insulative member with end portions of said first conductive member extending longitudinally parallel to said first bus bar out of side surfaces of said first insulative member for securement to said first bus bar and with said extending conductive portion of said first conductive member extending out a top surface of said insulative member through said aperture for securement to an electrical component which is to be electrically connected to said first bus bar.

7. The mounting assembly of claim 6, and further including:
a second bus bar extending substantially parallel to said first bus bar for a portion of its length, said second bus bar having a front and rear surface; and
a second conductive member substantially encased by said first insulative member with end portions of said second conductive member extending longitudinally parallel to said second bus bar out of said side surfaces of said first insulative member for securement to said second bus bar, said second conductive member having an extending conductive portion extending transversely away from said second bus bar and out a second aperture provided in said top surface of said first insulative member for securement to an electrical component which is to be electrically connected to said second bus bar.

8. The mounting assembly of claim 7, wherein said first and second bus bars have a pair of spaced apart openings provided in their respective front surfaces; and said end portions of said first and second conductive members having openings therethrough which are aligned with said spaced apart openings to facilitate securement of said first and second conductive members to the front surfaces of said first and second bus bars.

9. The mounting assembly of claim 8, wherein said spaced apart openings are tapped to permit the entry of screw threaded fastening means therein.

References Cited

UNITED STATES PATENTS 3,005,934  10/1961  Vogelsberg _____ 317—119

ROBERT K. SCHAEFER, *Primary Examiner.*

M. GINSBURG *Assistant Examiner.*